Sept. 27, 1949.    W. N. BUCKNER    2,482,837
PIMENTO CORING MACHINE

Filed March 7, 1945    2 Sheets-Sheet 1

INVENTOR.
William N. Buckner
BY
A. B. Bowman
ATTORNEY

Sept. 27, 1949.  W. N. BUCKNER  2,482,837
PIMENTO CORING MACHINE
Filed March 7, 1945  2 Sheets-Sheet 2
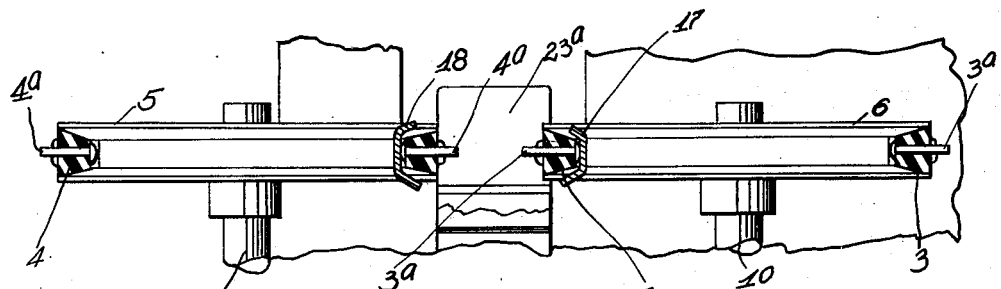
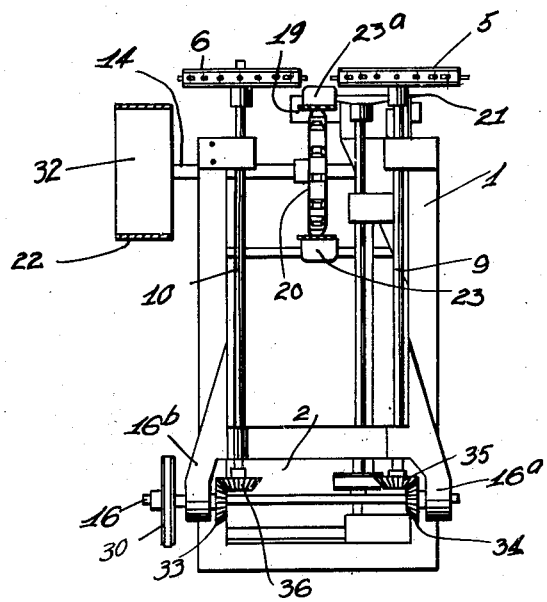
INVENTOR.
William N. Buckner
BY
A.B. Bowman
ATTORNEY Patented Sept. 27, 1949

2,482,837

UNITED STATES PATENT OFFICE 2,482,837

PIMENTO CORING MACHINE

William N. Buckner, San Diego, Calif., assignor to Old Mission Packing Corporation, Ltd., San Diego, Calif., a corporation of Nevada Application March 7, 1945, Serial No. 581,443

8 Claims. (Cl. 146—52)

My invention relates to a pimento coring machine, particularly adapted for use in connection with the preparation of pimentos for food and the objects of my invention are:

First, to provide a machine of this class particularly adapted for use in coring large quantities of pimentos within a given length of time;

Second, to provide a pimento coring machine of this class in which the core of the pimento is entirely removed from the shell of the pimento without undesirable damage thereof;

Third, to provide a pimento coring machine of this class which is very easy to operate and requires a minimum amount of help in proportion to the volume of production accomplished by said machine;

Fourth, to provide a pimento coring machine of this class having a continuously moving conveyor carrying a constant stream of pimentos through the coring operation attaining a very high production rate in the preparation of the pimentos;

Fifth, to provide a pimento coring machine of this class having an end cutoff knife and coring knockout teeth which perform very uniform operations on successive pimentos passing through my pimento coring machine;

Sixth, to provide a pimento coring machine of this class in which the percentage of loss is reduced to the extreme minimum;

Seventh, to provide a pimento coring machine of this class which is so constructed that it may be fed by a number of operators when desired in order to produce great quantities of cored pimentos in a short length of time; and Eighth, to provide a pimento coring machine of this class which is very simple and economical of construction, efficient in its action and which will not readily deteriorate or get out of order.

Figure 1:
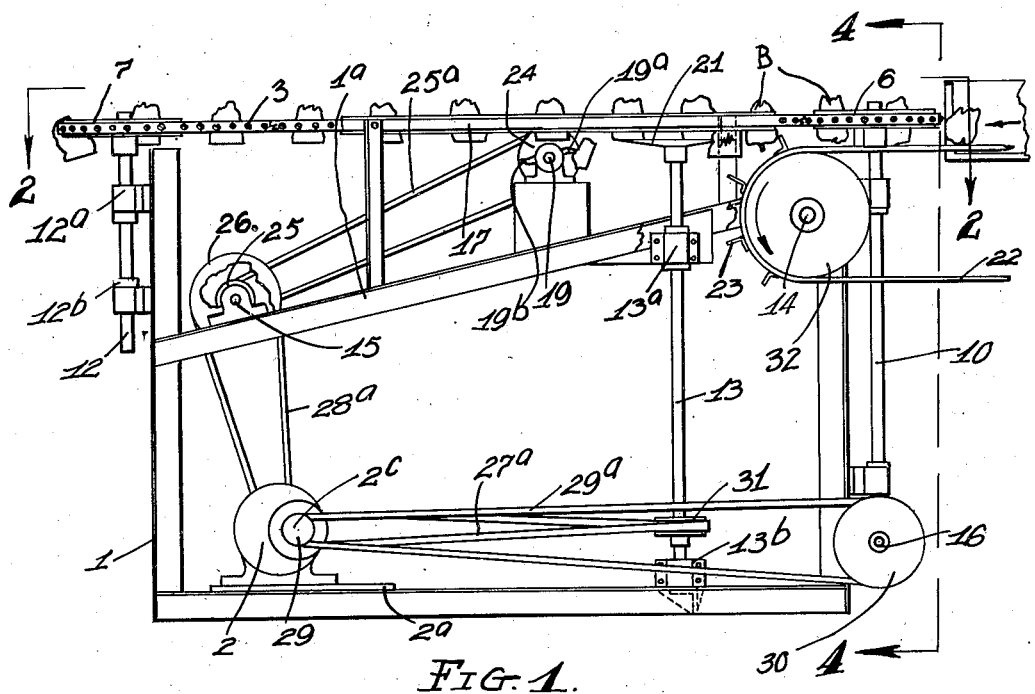
Figure 2:
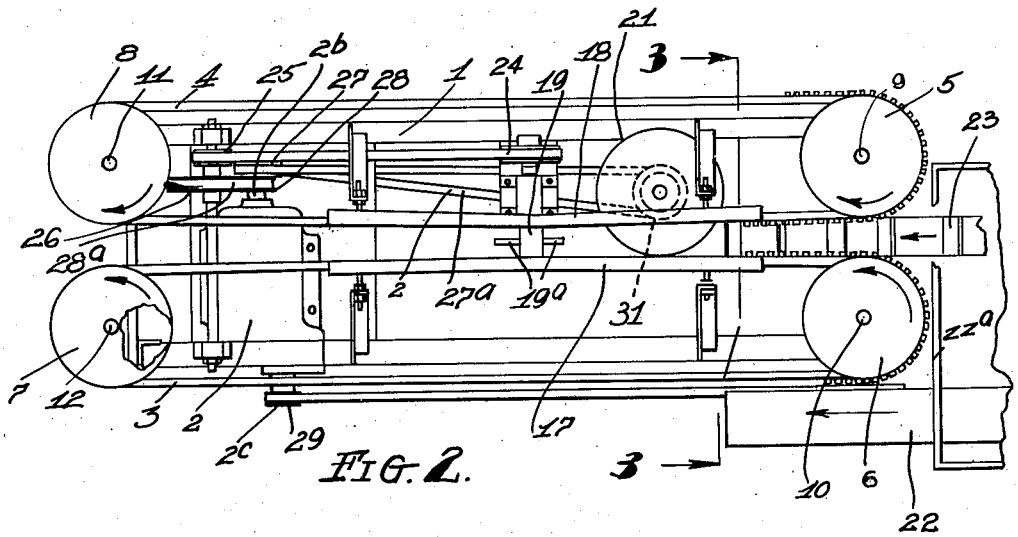

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming part of this application in which:

Figure 1 is a fragmentary side elevational view of my pimento coring machine; Fig. 2 is a fragmentary top or plan view taken from the line 2—2 of Fig. 1; Fig. 3 is an enlarged fragmentary sectional view taken from the line 3—3 of Fig. 2 and Fig. 4 is a sectional view taken from the line 4—4 of Fig. 1.

Similar characters of reference refer to similar parts and portions throughout the several views of the drawings:

The frame 1, motor 2, conveyor belts 3 and 4, conveyor pulleys 5, 6, 7 and 8, shafts 9, 10, 11, 12, 13, 14, 15 and 16, conveyor belt guides 17 and 18, knockout mandrel 19, sprocket 20, cutoff knife 21, conveyor feed belts 22 and 23, pulleys 24, 25, 26, 27, 28, 29, 30, 31 and 32 and the bevel gears 33, 34, 35 and 36 constitute the principal parts and portions of my pimento coring machine.

The frame 1, as shown in Fig. 1 of the drawings, is made of angle iron or other suitable structural material but may be made of various forms as desired by casting or other means of fabrication.

The motor 2 is mounted on the base member 2a which is a flat plate-like member and this motor 2 is provided with a high speed shaft 2b on one end and a low speed shaft 2c on its opposite end driven by a reduction gear train in the housing of the motor 2.

The pulley 29 on the low speed shaft 2c drives the belt 29a in engagement with the pulley 30 on the shaft 16. This shaft 16 is journalled in the brackets 16a and 16b rigidly connected to the frame 1.

Positioned on the shaft 16 are the gears 33 and 34 which are bevelled gears meshing with the bevelled gears 35 and 36 which drive the shafts 9 and 10 on the upper end of which are fixed the conveyor pulleys 5 and 6. Positioned around these pulleys 5 and 6 are the belts 4 and 3 respectively which are endless belts and pass over the conveyor pulleys 8 and 7 on the shafts 11 and 12 stationarily journalled in connection with the frame 1 by means of the bearings 12a and 12b, as shown best in Fig. 1 of the drawings.

Connected to the high speed shaft 2b of the motor 2 are the pulleys 27 and 28. The pulley 27 is engaged by the belt 27a which drives the pulley 31 in connection with the shaft 13 on the upper end of which is fixed the circular cutoff knife 21. The shaft 13 is rigidly journalled in connection with a frame 1 by means of the bearings 13a and 13b.

Engaging the pulley 28 is the belt 28a which passes over the pulley 26 and drives the shaft 15 together with the pulley 25 engaged by the belt 25a which revolves the knockout mandrel 19. This knockout mandrel 19 is rigidly connected to the angular frame member 1a on one side of the frame 1, as shown best in Fig. 1 of the drawings. The knockout mandrel 19 is arranged to revolve at high speed and is provided with radially extending knockout fingers 19a and 19b which traverse a circular path substantially tangent to the plane of the conveyor belts 3 and 4 and somewhat above the cutoff plane of the cutoff knife 21, all as shown best in Fig. 1 of the drawings.

The shaft 14 is driven by auxiliary means, not shown and is arranged to revolve in the direction of the arrow in Fig. 1 of the drawings carrying with it the pulley 32 and the belt 22 in connection therewith. Also carried on the shaft 14 is the sprocket 20 which engages the conveyor feed belt 23. This conveyor feed belt 23 is provided with upwardly extending clips 23a arranged to engage the pimentos B as shown in Fig. 1 of the drawings and advance them toward the conveyor belts 3 and 4. The conveyor belts 3 and 4, as shown in Fig. 3 of the drawing are provided with outwardly extending pins 3a and 4a between which the pimentos are engaged, as shown best in Figs. 1 and 3 of the drawings.

It will be here noted that the conveyor belt guides 17 and 18 converge toward the location of the knockout mandrel 19 and maintain the conveyor belts 3 and 4 in converging spaced relation to each other for squeezing the pimentos therebetween and rigidly holding the same while passing over the cutoff knife 21 and the knockout mandrel 19.

The conveyor feed belts 22 and 23 may be extended any distance desired providing the desired area upon which workers may place pimentos and sort the same. The conveyor feed belt 22 carries the pimentos toward the fence 22a and the pimentos are sorted during passage and placed on the conveyor feed belt 23.

The operation of my pimento coring machine and method for preparing pimentos is substantially as follows:

The pimentos are first heated until in a pliable condition. They are then placed on the conveyor feed belt 22 which passes as indicated by arrow in Fig. 2 of the drawing carrying them toward the fence 22a. During passage these pimentos are sorted and placed on the conveyor feed belt 23 which directs them toward and intermediate the conveyor belts 3 and 4. The clips 23a advance the pimentos into position intermediate the conveyor belts 3 and 4 where they are squeezed between the pins 3a and 4a of the conveyor belts 3 and 4 and are carried toward the revolving circular cutoff knife 21 which shaves off the bottom portion of the pimento at the stem end exposing the core at the lower end of the pimento. As the conveyor belts 3 and 4 advance toward the knockout mandrel 19, the conveyor belt guides 17 and 18 force the conveyor belts 3 and 4 to converge squeezing the pimento tightly between the pins 3a and 4a when the pimentos advance to the position of the knockout mandrel 19. This knockout mandrel 19 revolving at high speed is encountered by the pimento and the finger portions 19a pass through the skirt of the pimento and contact the core therein whereupon the core is knocked out of the lower open side of the pimento shell. The pimento then advances intermediate the conveyor belts 3 and 4 toward the rollers 7 and 8 where it is delivered to a washing machine which is no part of my present invention.

The herein described method employed in the preparation of pimentos for food embraces the heat treatment of the pimentos before they are run through my pimento coring machine. This heat treatment is quite important in order to attain a pliable condition of the pimento before it is squeezed between the conveyor belts 3 and 4 and contacted by the cutoff knife 21 and the teeth of the knockout mandrel 19a.

Fresh pimentos in the normal crisp condition tend to crack and break up when contacted by the pins 3a and 4a of the conveyor belts 3 and 4 and are sometimes badly broken by the action of the fingers 19a of the knockout mandrel 19. Therefore these pimentos must be heat treated until in the pliable condition previous to the coring operation in my pimento coring machine.

Though I have shown and described a particular construction, combination and arrangement of parts and portions and a certain method, I do not wish to be limited to the particular construction, combination and arrangement, nor to the particular method, but desire to include in the scope of my invention the construction, combination and arrangement and the method substantially as set forth in the appended claims.

Having thus described my invention, what I claim as new and desire to secure by Letters Patent is:

1. In a pimento coring machine, a pair of substantially parallel belts having opposed extending pins protruding into the space intermediate said belt, a revolving circular cutoff knife positioned near the lower side of said belts and communicating directly below the space between said conveyor belts arranged to cut off ends of pimentos extending below the edges of said belts, a revolving knockout mandrel having radially extending fingers positioned in spaced relation to said circular cutoff knife and positioned to engage the lower portion of pimentos between said belts with said radially extending fingers and means for revolving said knife and said mandrel.

2. The herein described method for coring pimentos consisting in heating the pimentos until in a pliable condition, then cutting off the stem end of said pimentos, and then striking and pulling the end of the core of said pimentos downwardly while holding the cut end down; whereby they are knocked out of said cut end without undesirable damage to the pliable structure of the pimento.

3. In a pimento coring machine, a pair of spaced conveyer belts, having opposed runs, and having their sides facing each other moving in synchronous substantially parallel spaced relation to each other, a revolving circular knife disposed below and on a plane at right angles to the sides of said belts, having its cutting edge in close proximity to the adjacent lower edges of said conveyer belts, and a revolving knockout mandrel operating on an axis at right angles to the sides of said belts and having radially extending fingers aligned intermediate said conveyer belts, and in close proximity to the lower edges thereof, said mandrel downstream from said knife, arranged to knock out pimento cores after the knife cuts the ends therefrom.

4. In a pimento coring machine, a pair of spaced conveyer belts, having opposed runs, and having their sides facing each other moving in synchronous substantially parallel spaced relation to each other, a revolving circular knife disposed below and on a plane at right angles to the sides of said belts, having its cutting edge in close proximity to the adjacent lower edges of said conveyer belts, and a revolving knockout mandrel operating on an axis at right angles to the sides of said belts and having radially extending fingers aligned intermediate said conveyer belts, and in close proximity to the lower edges thereof, said mandrel downstream from said knife, arranged to knock out pimento cores after the knife cuts the ends therefrom, said conveyer belts being endless belts, and substantially horizontal pulleys engageable with said belts.

5. In a pimento coring machine, a pair of spaced conveyer belts, having opposed runs, and having their sides facing each other moving in synchronous substantially parallel spaced relation to each other, a revolving circular knife disposed below and on a plane at right angles to the sides of said belts, having its cutting edge in close proximity to the adjacent lower edges of said conveyer belts, and a revolving knockout mandrel operating on an axis at right angles to the sides of said belts and having radially extending fingers aligned intermediate said conveyer belts, and in close proximity to the lower edges thereof, said mandrel downstream from said knife, arranged to knock out pimento cores after the knife cuts the ends therefrom, and a pair of conveyer belt guides, tending to hold said conveyer belts in spaced relation toward each other.

6. In a pimento coring machine, a pair of spaced conveyer belts, having opposed runs, and having their sides facing each other moving in synchronous substantially parallel spaced relation to each other, a revolving circular knife disposed below and on a plane at right angles to the sides of said belts, having its cutting edge in close proximity to the adjacent lower edges of said conveyer belts, and a revolving knockout mandrel operating on an axis at right angles to the sides of said belts and having radially extending fingers aligned intermediate said conveyer belts, and in close proximity to the lower edges thereof, said mandrel downstream from said knife, arranged to knock out pimento cores after the knife cuts the ends therefrom, said conveyer belts having protruding pins extending in opposed relation to each other engageable with pimentos passing therebetween.

7. In a pimento coring machine of the class described, a conveyer feed belt having clips thereon engageable with pimentos, a pair of spaced conveyer belts having opposed runs and operating in substantially parallel relation to each other, having flat sides facing each other, and at right angles to the plane of said conveyer feed belt at opposite sides of said conveyer feed belt, whereby pimentos are transferred from said conveyer feed belt to an intermediate position between said conveyer belts, a revolving circular cut-off knife on a plane at right angles to the sides of said conveyer belts, and below the edges thereof, positioned near adjacent edges of said conveyer belts, and a revolving knockout mandrel having widely spaced radially extending fingers engageable with pimentos intermediate said conveyer belts, and positioned below said belts downstream from said knife, for knocking cores out of said pimentos after the ends thereof are cut off by said knife.

8. In a pimento coring machine of the class described, a conveyer feed belt having clips thereon engageable with pimentos, a pair of spaced conveyer belts having opposed runs and operating in substantially parallel relation to each other, having flat sides facing each other, and at right angles to the plane of said conveyer feed belt at opposite sides of said conveyer feed belt, whereby pimentos are transferred from said conveyer feed belt to an intermediate position between said conveyer belts, a revolving circular cut-off knife on a plane at right angles to the sides of said conveyer belts, and below the edges thereof, positioned near adjacent edges of said conveyer belts, and a revolving knockout mandrel having widely spaced radially extending fingers engageable with pimentos intermediate said conveyer belts, and positioned below said belts downstream from said knife, for knocking cores out of said pimentos after the ends thereof are cut off by said knife, and conveyer belt guides tending to hold said conveyer belts together in converging relation to each other near said knockout mandrel.

WILLIAM N. BUCKNER.

REFERENCES CITED

The following references are of record in the file of this patent:

UNITED STATES PATENTS

| Number | Name | Date |
| --- | --- | --- |
| 1,438,467 | Walden | Dec. 12, 1922 |
| 1,449,610 | Kloster et al. | Mar. 27, 1923 |
| 1,699,951 | Christiansen et al. | Jan. 22, 1929 |
| 1,775,918 | Smith | Sept. 16, 1930 |
| 1,890,676 | Fox | Dec. 13, 1932 |
| 2,299,137 | Geren et al. | Oct. 20, 1942 |